United States Patent
Meise et al.

(10) Patent No.: US 8,597,792 B2
(45) Date of Patent: *Dec. 3, 2013

(54) HIGH-STRENGTH FILM LAMINATES HAVING LAYERS OF PLASTICIZER-CONTAINING POLYVINYL (N)ACETAL AND PLASTICIZER-CONTAINING POLYVINYL (ISO)ACETAL

(75) Inventors: Markus Meise, Mannheim (DE); Jan Beekhuizen, Troisdorf (DE); Martin Steuer, Liederbach (DE); Uwe Keller, Bonn (DE); Michael Frank, Nieder-Olm (DE)

(73) Assignee: Kuraray Europe GmbH, Hattersheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/552,679

(22) Filed: Jul. 19, 2012

(65) Prior Publication Data

US 2013/0022824 A1 Jan. 24, 2013

(30) Foreign Application Priority Data

Jul. 22, 2011 (EP) .................................... 11175080

(51) Int. Cl.
*B32B 17/10* (2006.01)
*B32B 27/22* (2006.01)
*B32B 27/08* (2006.01)

(52) U.S. Cl.
USPC ............ 428/436; 428/437; 428/524; 428/525

(58) Field of Classification Search
USPC .................. 428/436, 437, 524, 525
See application file for complete search history.

(56) References Cited

U.S. PATENT DOCUMENTS

| 5,340,654 | A | 8/1994 | Ueda et al. |
| 5,478,615 | A | 12/1995 | Rehfeld et al. |
| 6,801,652 | B1 | 10/2004 | Stanzl et al. |
| 7,312,275 | B2 | 12/2007 | Papenfuhs et al. |
| 2007/0014976 | A1 | 1/2007 | Matsudo |
| 2008/0286542 | A1 | 11/2008 | Hayes et al. |

FOREIGN PATENT DOCUMENTS

| EP | 0185863 B1 | 7/1986 |
| EP | 0 387 148 B1 | 8/1993 |
| EP | 1 118 258 B1 | 7/2001 |
| EP | 1 527 107 B1 | 5/2005 |
| EP | 1 606 325 | 3/2008 |
| JP | 2011-42552 A | 3/2011 |
| WO | 02/102591 A1 | 12/2002 |
| WO | 03/020776 A1 | 3/2003 |
| WO | 03/033583 A1 | 4/2003 |
| WO | 2004/063231 A1 | 7/2004 |
| WO | 2006/102049 A2 | 9/2006 |
| WO | 2008/137367 A2 | 11/2008 |
| WO | 2011/024788 A1 | 3/2011 |
| WO | 2011/078314 A1 | 6/2011 |
| WO | 2011/081190 A1 | 7/2011 |

OTHER PUBLICATIONS

Andrew F. Fitzhugh and Robert N. Crozier, "Relation of Composition of Polyvinyl Acetals to Their Physical Properties. I Acetals of Saturated Aliphatic Aldehyde", Journal of Polymer Science (1951), vol. III, No. 2, pp. 225-241.

*Primary Examiner* — D. S. Nakarani
(74) *Attorney, Agent, or Firm* — Brooks Kushman P.C.

(57) ABSTRACT

The invention relates to film laminates, formed from at least three layers A, B and C, each layer containing at least one plasticizer and at least one polyvinyl acetal, wherein, at least one of the layers A, B or C contains at least one polyvinyl (iso)acetal having a mean degree of polymerization of less than 3000, 10 to 25% by weight of polyvinyl alcohol groups and a proportion 50 to 80% by weight of polyvinyl (iso)acetal groups, and wherein layer B has a plasticizer content of less than 32% by weight. The film laminates can be used for the production of glass/film laminate/glass composites for motor vehicles, aircraft, ships, architectural glazings, façade components, or for the production of photovoltaic modules.

13 Claims, No Drawings

HIGH-STRENGTH FILM LAMINATES HAVING LAYERS OF PLASTICIZER-CONTAINING POLYVINYL (N)ACETAL AND PLASTICIZER-CONTAINING POLYVINYL (ISO)ACETAL

CROSS-REFERENCE TO RELATED APPLICATIONS

This application claims priority to European Patent Application No. EP 11175080.8 filed Jul. 22, 2011 which is herein incorporated by reference.

BACKGROUND OF THE INVENTION

1. Field of the Invention

The invention is in the field of high-strength film laminates. The laminates of the invention have layers of plasticizer-containing polyvinyl (n)acetal and plasticizer-containing polyvinyl (iso)acetal

2. Background Art

The invention relates to a film laminate, for example suitable as an intermediate layer in laminated safety glazings, the film laminate being formed from at least three layers of plasticizer-containing polyvinyl (n)acetals and/or polyvinyl (iso) acetals, and having good penetration properties.

Laminate safety glazings generally consist of two glass panes and an intermediate film connecting the glass panes. Plasticizer-containing polyvinyl butyral (PVB) is predominantly used as the film material and is obtainable by reacting polyvinyl alcohol with n-butyraldehyde.

An increasingly important feature of safety glazings is the penetration strength thereof, that is to say the resistance thereof to the effect of external force. The penetration force can be augmented by a thicker glass pane, and also by correspondingly thicker intermediate-layer films. For example "hurricane-proof" glazings are thus known, which offer improved protection against flying objects. To this end, relatively thick standard films made of PVB are generally used, which, however, reduces the transparency of the glazing. In addition, a relatively thick glazing is undesirable due to the limited installation depth and the relatively high costs.

Furthermore, relatively mechanically stable films, for example made of PET or PU, can be laminated between two PVB films to improve the penetration strength of safety glazings. However, this involves an additional processing step and poses the risk of undesired delamination.

In general, the mechanical strength of PVB films can be adjusted by the plasticizer content thereof or by the proportion of polyvinyl alcohol groups or polyvinyl acetate groups in the polyvinyl acetal. For example, U.S. Pat. No. 5,340,654 or WO 2006/102049 describe multi-layer systems in which a first layer contains a polyvinyl butyral having a high residual acetate content and a second layer contains a polyvinyl butyral having a low residual acetate content. Similarly, WO 2008/137367 describes multi-layer systems in which the sub-layers made of polyvinyl butyral differ in terms of their polyvinyl alcohol content.

Due to the different residual acetate contents and different proportions of polyvinyl alcohol groups, the sub-layers have a different plasticizer content and therefore different mechanical strength. Mechanical decoupling and therefore improved soundproofing are thus achieved.

The known multi-layer films are based on polyvinyl butyral, which is obtainable by reacting polyvinyl alcohol with n-butyraldehyde. Different plasticizer contents of the layers, which can be assimilated in part by migration, are obtained with use of polyvinyl butyrals having different polyvinyl alcohol or polyvinyl acetate contents. Plasticizer migration can also lead to incompatibilities with the polymer matrix and therefore to plasticizer exudation. The mechanical properties of the films, such as tensile strength or tear strength, likewise are highly dependent on plasticizer content. The mechanical properties of the film generally worsen with an increase in plasticizer content and with a decreasing number of polyvinyl alcohol groups of the polyvinyl butyral used.

SUMMARY OF THE INVENTION

An object of the present invention was therefore to produce multi-layer films, for example for safety glazings, having improved mechanical properties, these films having high plasticizer compatibility due to the selection of the polyvinyl acetals used. It has surprisingly been found that these and other objects are met by providing film laminates containing polyvinyl acetals formed from at least three sub-layers, of which at least one sub-layer contains polyvinyl (iso)acetal, exhibit much better plasticizer compatibility compared to film laminates containing only sub-layers based on polyvinyl (n)acetals.

DETAILED DESCRIPTION OF THE PREFERRED EMBODIMENT(S)

Mixtures of polyvinyl (iso)acetal with dibutyl phthalate as a plasticizer are described by J. Fitzhugh and R Croizer J. Polym. Sci (1951) Vol VIII, p. 225-241. This publication does not concern the production of films and use thereof. Plasticizer-containing polyvinyl (iso)acetals are also known from US 2008/0286542 for the production of intermediate-layer films for decorative glass elements. The polyvinyl (iso)acetals described in that instance for laminate safety glazings have an excessively low degree of acetalisation of 8 to 30% by weight and therefore exhibit insufficient plasticizer absorption. Accordingly, US 2008/0286542 discloses merely multi-layered films, in which plasticizer-containing polyvinyl (iso) acetal having a low degree of acetalisation is laminated between two layers of plasticizer-containing polyvinyl (n)acetal.

Film laminates which do not contain polyvinyl (iso)acetals are known for example from WO 2006/102049 A1, WO 2011/078314 A1, WO 2011/081190 A1, US 2007014976, WO 2011/024788 A1 and JP 2011042552. The advantageous properties of polyvinyl (iso)acetals are not described herein.

The present invention therefore relates to a film laminate, formed from at least three layers A, B and C, each containing at least one plasticizer and at least one polyvinyl acetal, wherein as the polyvinyl acetals, at least one of the layers A, B or C contains at least one polyvinyl (iso)acetal having a mean degree of polymerisation of less than 3000, a proportion of polyvinyl alcohol groups of 10 to 25% by weight and a proportion of polyvinyl (iso)acetal groups of 50 to 80% by weight, and wherein layer B has a plasticizer content of less than 32% by weight.

Preferably, layer B is located between layer A and C. Layer B may have a plasticizer content of 30 to 15% by weight, more preferably 25 to 15% by weight, and most preferably of 20 to 15% by weight.

Layers A and C may have the same or different plasticizer content of 60 to 15% by weight, preferably 50 to 25% by weight and most preferably 30 to 18% by weight.

The polyvinyl alcohol content of the polyvinyl (iso)acetals and polyvinyl (n)acetals used may be the same or different in the layers and may be 10 to 25% by weight, preferably 18 to 23% by weight.

In another embodiment of the invention layer B is located between layer A and C and contains polyvinyl acetal having the same or a larger proportion of polyvinyl alcohol groups than the polyvinyl acetal in layer A and C. Preferably, the proportion of polyvinyl alcohol groups in the polyvinyl acetal of layer B is from 0.1 to 10% by weight, more preferably by 0.1 to 5% by weight and most preferably by 0.1 to 2% by weight larger than the proportion of polyvinyl alcohol groups of the polyvinyl acetal in layer A and C.

The polyvinylacetals (polyvinyl (iso)acetals and polyvinyl (n)acetals) used in the layers A, B and C may preferably have the same or different mean degree of polymerisation between 200 and 2800. Preferably, the polyvinylacetals (polyvinyl (iso)acetals and polyvinyl (n)acetals) used in the layers A, B and C have a mean degree of polymerisation between 900 and 2500.

Film laminates having three layers have proven to be easily producible in practice. The film laminates according to the invention may also consist of more than three layers (for example 4, 5, 6 or 7), wherein the layers have the aforementioned properties or compositions, or those mentioned hereinafter. The embodiments with the layer sequences A, B and C are to be understood to be exemplary. The present invention also includes, for example, embodiments with the layer sequences ABCA or ABCAB or ABCABC with the described compositions of layers A, B and C.

In a second embodiment of the invention, the film laminates have the following sequence and composition of the layers A, B and C:

a layer A containing at least one first plasticizer and one first polyvinyl (iso)acetal having a proportion of polyvinyl (iso)acetal groups of 50 to 80% by weight and a proportion of polyvinyl alcohol groups of 10 to 25% by weight; a layer B containing at least one second plasticizer and one polyvinyl (n)acetal having a proportion of polyvinyl alcohol groups of 10 to 25% by weight; and a layer C, containing at least one third plasticizer and one second polyvinyl (iso)acetal having a proportion of polyvinyl (iso)acetal groups of 50 to 80% by weight and a proportion of polyvinyl alcohol groups of 10 to 25% by weight.

In a third embodiment of the invention, the film laminates have the following sequence and composition of the layers A, B and C:

a layer A containing at least one first plasticizer and one first polyvinyl (n)acetal having a proportion of polyvinyl alcohol groups of 10 to 25% by weight; a layer B containing at least one second plasticizer and polyvinyl (iso)acetal having a proportion of polyvinyl (iso)acetal groups of 50 to 80% by weight and a proportion of polyvinyl alcohol groups of 10 to 25% by weight; and a layer C, containing at least one third plasticizer and one second polyvinyl (n)acetal having a proportion of polyvinyl alcohol groups of 10 to 25% by weight.

In a fourth embodiment of the invention, the film laminates have the following sequence and composition of the layers A, B and C:

a layer A containing at least one first plasticizer and one first polyvinyl (iso)acetal having a proportion of polyvinyl (iso)acetal groups of 50 to 80% by weight and a proportion of polyvinyl alcohol groups of 10 to 25% by weight; a layer B containing at least one second plasticizer and second polyvinyl (iso)acetal having a proportion of polyvinyl (iso)acetal groups of 50 to 80% by weight and a proportion of polyvinyl alcohol groups of 10 to 25% by weight; and, a layer C, containing at least one third plasticizer and one third polyvinyl (iso)acetal having a proportion of polyvinyl (iso)acetal groups of 50 to 80% by weight and a proportion of polyvinyl alcohol groups of 10 to 25% by weight.

The layers used in accordance with the invention contain polyvinyl acetals which are obtained by acetalisation of polyvinyl alcohols, in each case with "n-" (that is to say linear compounds) or "iso-" aldehydes or keto compounds (that is to say branched compounds).

The polyvinyl (iso)acetals used in accordance with the invention are preferably obtained by reacting at least one polyvinyl alcohol with one or more aliphatic keto compounds containing 4 to 10 carbon atoms and having at least one branch at the position alpha or beta to the keto group. The aliphatic keto compounds used to produce polyvinyl (iso)acetals can be the same or different in different layers, but are preferably identical in different layers. The polyvinyl (iso)acetals in different layers are more preferably chemically identical, that is to say they have the same proportions of polyvinyl alcohol groups and polyvinyl acetate groups and the same degree of polymerisation. In particular, iso-butyraldehyde is used for production of the polyvinyl (iso)acetals.

When producing the polyvinyl (iso)acetals used in accordance with the invention, it is also possible, besides the described branched keto compounds, to additionally use one or more unbranched aliphatic keto compounds containing 2 to 10 carbon atoms for acetalisation. A mixture of n-butyraldehyde and/or acetaldehyde with iso-butyraldehyde is preferably used. The proportion of acetal groups in the polyvinyl (iso)acetal resulting from branched keto compounds should be more than 60 mol %, preferably more than 80 mol %, of the sum of branched and unbranched acetal groups.

The polyvinyl (n)acetal used in accordance with the invention is produced in particular from the reaction of at least one polyvinyl alcohol with one or more aliphatic unbranched keto compounds containing 2 to 10 carbon atoms. For this purpose, n-butyraldehyde is preferably used.

When producing the polyvinyl (n)acetals used in accordance with the invention, it is also possible, besides the described unbranched keto compounds, to additionally use one or more branched aliphatic keto compounds containing 4 to 10 carbon atoms for acetalisation. A mixture of n-butyraldehyde and/or acetaldehyde with iso-butyraldehyde is preferably used. The proportion of acetal groups in the polyvinyl (n)acetal resulting from unbranched keto compounds should be more than 60 mol %, preferably more than 80 mol %, of the sum of branched and unbranched acetal groups.

The polyvinyl alcohols in different layers used to produce the polyvinyl acetals (polyvinyl (iso)acetal and polyvinyl (n)acetal) can be the same or different, in pure form or in the form of a mixture of polyvinyl alcohols having a different degree of polymerisation or degree of hydrolysis.

The polyvinyl acetate content of the polyvinyl acetals (polyvinyl (iso)acetal and polyvinyl (n)acetal) in different layers can be adjusted by use of a polyvinyl alcohol hydrolysed to a corresponding proportion. The polarity of the polyvinyl acetal is influenced by the polyvinyl acetate content, whereby the plasticizer compatibility and the mechanical strength of the respective sub-film also change. It is also possible to carry out the acetalisation of the polyvinyl alcohols using a mixture of a plurality of aldehydes or keto compounds.

The layers preferably contain polyvinyl (iso)acetals and/or polyvinyl (n)acetals having a proportion of polyvinyl acetate groups, based on the layers, of 0.1 to 15% by weight, preferably 0.1 to 8% by weight, and in particular 0.1 to 3% by weight, these being the same or different in each case. A proportion of polyvinyl acetate groups of 0.1 to 2% by weight is most preferred.

The layers preferably contain uncrosslinked polyvinyl (iso)acetal and/or polyvinyl (n)acetal. The use of crosslinked polyvinyl (iso)acetals and/or crosslinked polyvinyl (n)acetals is also possible. Methods for crosslinking polyvinyl acetals are described for example in EP 1527107 B1 and WO 2004/063231 A1 (thermal self-crosslinking of polyvinyl acetals containing carboxyl groups), EP 1606325 A1 (polyvinyl acetals crosslinked with polyaldehydes) and WO 03/020776 A1 (polyvinyl acetals crosslinked with glyoxylic acid).

The polyvinylacetals (polyvinyl (iso)acetals and polyvinyl (n)acetals) used in the layers A, B and C may have the same or different mean degree of polymerisation between 200 and 2800. Preferably, the polyvinylacetals (polyvinyl (iso)acetals and polyvinyl (n)acetals) used in the layers A, B and C have a mean degree of polymerisation between 900 and 2500.

Generally, the compatibility between plasticizer and polyvinyl acetals decreases with a drop in the polar nature of the plasticizer. Plasticizers of relatively high polarity are therefore more compatible with polyvinyl acetal than those of relatively low polarity. Alternatively, the compatibility of plasticizers of low polarity increases with a rise in the degree of acetalisation, that is to say with a drop in the number of hydroxyl groups and therefore in the polarity, of the polyvinyl acetal.

Due to the different polyvinyl acetal groups (n and iso) of the layers, these layers may absorb different amounts of plasticizers with the same number of polyvinyl alcohol groups, without exudation or migration of the plasticizer. Different amounts of plasticizer also result in different mechanical properties of the layers, and therefore the mechanical properties of the layers and therefore of the film laminate can be adjusted via the selection of the plasticizer and/or of the polyvinyl alcohol content of the polyvinyl acetals.

Adjacent layers of the film laminates preferably each comprise polyvinyl acetals, of which the proportions of polyvinyl alcohol groups differ by at most 2% by weight. Adjacent layers most preferably comprise polyvinyl acetals having the same proportion of polyvinyl alcohol groups. In particular, these variants form one embodiment of the invention having adjacent layers each containing polyvinyl (iso)acetals and polyvinyl (n)acetals.

The layers may each contain the same or different plasticizers (first, second or third). The use of chemically identical plasticizers in all layers is preferred. Adjacent layers of the film laminates may have plasticizer contents which differ by at most 10 phr, preferably at most 5 phr and most preferably at most 2 phr (phr=parts by weight of plasticizer based on 100 parts by weight of polyvinyl acetal).

The layers may contain plasticizers or plasticizer mixtures from at least one of the following plasticizers known for PVB films:
  esters of polyvalent aliphatic or aromatic acids, for example dialkyl adipates such as dihexyl adipate, dioctyl adipate, hexylcyclohexyl adipate, mixtures of heptyl adipates and nonyl adipates, diisononyl adipate, heptylnonyl adipate, and esters of adipic acid with cycloaliphatic ester alcohols or ester alcohols containing ether bonds, dialkyl sebacates such as dibutyl sebacate, and esters of sebacic acid with cycloaliphatic ester alcohols or ester alcohols containing ether bonds, esters of phthalic acid such as butylbenzyl phthalate or bis-2-butoxyethyl phthalate, esters of cyclohexane dicarboxylic acid such as 1,2-cyclohexane dicarboxylic acid diisononyl ester
  esters or ethers of polyvalent aliphatic or aromatic alcohols or oligoether glycols with one or more unbranched or branched aliphatic or aromatic substituents, such as esters of diglycols, triglycols or tetraglycols with linear or branched aliphatic or cycloaliphatic carboxylic acids; examples of this last group include diethylene glycol-bis-(2-ethylhexanoate), triethylene glycol-bis-(2-ethylhexanoate), triethylene glycol-bis-(2-ethylbutanoate), tetraethylene glycol-bis-n-heptanoate, triethylene glycol-bis-n-heptanoate, triethylene glycol-bis-n-hexanoate, tetraethylene glycol dimethyl ether and/or dipropylene glycol benzoate
  phosphates of with aliphatic or aromatic ester alcohols, such as tris(2-ethylhexyl) phosphate (TOF), triethyl phosphate, diphenyl-2-ethylhexyl phosphate, and/or tricresyl phosphate
  esters of citric acid, succinic acid, and/or fumaric acid.

One or more of the following plasticizers is/are most preferably used: di-2-ethylhexyl sebacate (DOS), di-2-ethylhexyl adipate (DOA), dihexyl adipate (DHA), dibutyl sebacate (DBS), triethylene glycol-bis-n heptanoate (3G7), tetraethylene glycol-bis-n-heptanoate (4G7), triethylene glycol-bis-2-ethyl hexanoate (3GO or 3G8), tetraethylene glycol-bis-n-2-ethyl hexanoate (4GO or 4G8), di-2-butoxyethyl adipate (DBEA), di-2-butoxyethoxyethyl adipate (DBEEA), di-2-butoxyethyl sebacate (DBES), di-2-ethylhexyl phthalate (DOP), di-isononyl phthalate (DINP), triethylene glycol-bis-isononanoate, triethylene glycol-bis-2-propyl hexanoate, 1,2-cyclohexane dicarboxylic acid diisononyl ester (DINCH), tris(2-ethylhexyl) phosphate (TOF) and dipropylene glycol benzoate.

In addition, the layers may contain further additives, such as residual amounts of water, UV absorbers, antioxidants, adhesion regulators, optical brighteners, stabilisers, dyes, processing aids, organic or inorganic nanoparticles, pyrogenic silicic acid, and/or surface-active substances.

In a variant of the invention, all layers contain the aforementioned additives largely in the same concentration. In a specific variant of the invention, at least one of the layers does not contain any adhesion regulators (anti-stick agents). Within the scope of the present invention, anti-stick agents are understood to means compounds with which the adhesion of plasticizer-containing polyvinyl acetal films to glass surfaces can be adjusted. Compounds of this type are known to a person skilled in the art; alkaline or alkaline earth metal salts of organic acids, such as potassium/magnesium acetate, are often used in practice for this purpose.

To improve rigidity, it is also possible for at least one of the layers to contain 0.001 to 20% by weight $SiO_2$, preferably 1 to 15% by weight, in particular 5 to 10% by weight, optionally doped with $Al_2O_3$ or $Z_rO_2$.

Film laminates according to the invention preferably have an industrially conventional overall thickness, for example, of 0.38, 0.76, and 1.14 mm (that is to say multiples of 0.38 mm).

To produce the film laminates according to the invention, the layers may firstly be produced individually by extrusion and then joined together mechanically, for example by being wound up together on a reel to form the intermediate-layer film according to the invention. It is also possible to produce the film laminates by simultaneous co-extrusion of the layers. For example, co-extrusion may be carried out using an accordingly equipped multi-layer die or a feed block.

In the automotive industry, films are often used which have a "colour strip" in the upper region. To this end, either the upper part of the film can be co-extruded with an accordingly coloured polymer melt, or, in a multi-layer system, one of the layers may be coloured differently. In the present invention, this can be achieved by colouring at least one layer in full or in part.

The film laminates or layers according to the invention are generally produced by extrusion or co-extrusion and are provided under certain conditions (melt pressure, melt temperature and die temperature) with a melt fracture surface, that is to say a stochastic surface roughness.

Alternatively, a film laminate according to the invention already produced can be embossed with a generally non-stochastic roughness by an embossing process between at least one pair of rolls. Embossed films generally exhibit improved deaeration behaviour during safety glass production and are preferably used in the automotive industry. Irrespective of the production method, film laminates according to the invention have a surface structure, applied on one side or more preferably on both sides, with a roughness $R_z$ of 15 to 150 μm, preferably 15 to 100 μm, more preferably 20 to 80 μm, and in particular, an $R_z$ of 40 to 75 μm.

The production and composition of films based on polyvinyl acetals is described in principle, for example, in EP 185 863 B1, EP 1 118 258 B1, WO 02/102591 A1, EP 1 118 258 B1 or EP 387 148 B1.

Film laminates according to the invention are well suited for the production of glass/film laminate/glass, glass/film laminate/plastic composites, or plastic/film laminate/plastic composites. In particular, plastic panes made of polycarbonate, PET or PMMA are used.

The film laminates are particularly suitable for the production of glass/film laminate/glass, glass/film laminate/plastic composites, or plastic/film laminate/plastic composites for motor vehicles, aircraft, ships, architectural glazings, façade components, or for the production of photovoltaic modules.

In particular, the films according to the invention can be used for the production of laminated safety glazings by lamination with one or more glass panes in the manner known to a person skilled in the art. The laminated safety glazings can be used in the automotive industry, for example as windscreens, and in the field of architecture, for example in windows or transparent façade components, or in the manufacture of furniture.

For windscreens with HUD functionality, advantageously at least one of the layers A, B and C is provided with a wedged-shaped cross-section. It is preferred to provide layer B with a wedged-shaped cross-section and layers A and C with a uniform (plan parallel) cross-section.

Measurement Methods

The polyvinyl alcohol content and polyvinyl acetate content of PVB were determined in accordance with ASTM D 1396-92. The degree of acetalisation (=butyral content) can be calculated as the remaining portion from the sum of polyvinyl alcohol content and polyvinyl acetate content determined in accordance with ASTM D 1396-92 needed to make one hundred. Conversion from % by weight into % by mol is achieved by formulas known to a person skilled in the art.

The plasticizer content of the films was established by dissolving the film in ethanol and by subsequent quantitative gas chromatography. In order to establish the plasticizer content of the layers, the multi-layer films have to be separated again after a conditioning period of approximately one week, that is to say once plasticizer migration has largely stopped, and measured individually.

Measurement of the Tensile Properties of the Films

The values for the tear strengths and ultimate elongations of the film were determined by means of tensile test machine (TIRA) in accordance with ISO 527 at a rate of 200 mm/min.

Determination of the Ball Drop Test According to ECE43

The values for the ball drop test were determined in accordance with ECE43 using a 2.26 Kg steel ball on glass panes measuring 30×30 cm, having a thickness of 2 mm, and containing the films described in the cited examples. The test was carried out on 10 glass samples at a temperature and relative humidity according to ECE43.

Pummel Test

A "pummel test" was used to test the adhesion of films based on plasticizer-containing, partly acetalised polyvinyl alcohol and to examine the effect of anti-stick agents, this test being described in certain variants in the literature. Pummel values provided within the scope of the present invention were determined by means of the pummel test as described in WO 03/033583 A1.

Compressive Shear Test

A "compressive shear test" according to the following description was carried out to assess the adhesion of a PVB film to mineral glass. To produce the specimen, the PVB adhesive film to be tested was placed between two flat silicate glass panes measuring 300 mm×300 mm and 4 mm thick, was deaerated using calendar rolls to form a preliminary glass composite, and was then compressed in an autoclave at a pressure of 12 bar and at a temperature of 140° C. over a period of 30 min to form a flat laminated safety glass. 10 samples measuring 25.4 mm×25.4 mm were cut from the laminated safety glass thus produced. These samples were clamped at an angle of 45° in a two-part test apparatus. The upper half was subjected to a continuously increasing force directed exactly vertically downwards until shearing occurred within the specimen, that is to say within the laminated safety glass to be tested.

The test parameters were as follows:

| | |
|---|---|
| Specimen: | Square, 25.4 mm × 25.4 mm |
| Arrangement: | In each case, lower pane with the air or flame side towards the film (air/air), or upper and lower pane each with the tin side towards the film (bath/bath) |
| Storage before the test: | 4 h under normal ambient conditions 23° C./50% RH |
| Feed: | 2.5 mm/min |
| Number of samples: | 10 |
| Evaluation: | Maximum force require for shearing the film off the glass. The force was based on specimen surface area (in N/mm² or psi) |

EXAMPLES

General Synthesis Procedure for Polyvinyl (n)Acetal 100 parts by weight of the polyvinyl alcohol Mowiol 28-99 (commercial product from Kuraray Europe GmbH) were dissolved in 975 parts by weight of water while heating to 90° C. 57.5 parts by weight of n-butyraldehyde were added at a temperature of 40° C., and 75 parts by weight of 20% hydrochloric acid were added at a temperature of 12° C., while stirring. The mixture was heated to 73° C. after precipitation of the polyvinyl butyral (PVB) and was stirred at this temperature for two hours. After cooling to room temperature, the PVB was separated off, washed neutral with water, and dried. A polyvinyl (n)acetal having a polyvinyl alcohol content of 20.3% by weight and a polyvinyl acetate content of 0.9% by weight was obtained.

General Synthesis Procedure for Polyvinyl (iso)Acetal 100 parts by weight of the polyvinyl alcohol Mowiol 28-99 (commercial product from Kuraray Europe GmbH) were dissolved in 975 parts by weight of water while heating to 90° C. 57.6 parts by weight of iso-butyraldehyde, and 75 parts by weight of 20% hydrochloric acid were added at a temperature of 12° C., while stirring. The mixture was heated to 73° C. after precipitation of the polyvinyl butyral (PVB) and was stirred at this temperature for two hours. After cooling to room temperature, the PVB was separated off, washed neutral with water, and dried. A polyvinyl (iso)acetal having a polyvinyl alcohol content of 20.3% by weight and a polyvinyl acetate content of 1.2% by weight was obtained.

With use of 55.6 parts by weight of iso-butyraldehyde under conditions which were otherwise identical, a polyvinyl (iso)acetal having a polyvinyl alcohol content of 22.3% by weight and a polyvinyl acetate content of 1.2% by weight was obtained.

Production of Films

Films formed of sub-films of the composition according to Tables 1 and 2 were produced by being combined together. 3G8 (triethylene glycol) was used as a plasticizer. The plasticizer proportion was identical during the process of combining the layers.

Example 1 shows films according to the invention having a polyvinyl(iso)butyral/polyvinyl(n)butyral/polyvinyl(iso)butyral structure, in each case with the same polyvinyl alcohol and polyvinyl acetate contents. Comparative example 2 shows a film not according to the invention having a polyvinyl (n)butyral/polyvinyl(n)butyral/polyvinyl(n)butyral structure with the same polyvinyl alcohol and polyvinyl acetate contents.

Table 3 shows physical data regarding the films. It shows that although the adhesive properties of the films to glass are at a similar level, a much better penetration strength is obtained from the films according to the invention.

Besides the glass and film thicknesses already mentioned, the penetration strengths of laminated safety glass are also dependent on the glass adhesion of the films used. It is generally known that films having relatively high glass adhesion (Pummel 8 to 10) deliver worse ball drop test results compared to films having relatively low (Pummel 1 to 3) glass adhesion with otherwise identical structure, that is to say with use of the same glass and film thicknesses.

In order to assess the influence of the mechanical film properties on the penetration properties by means of the ball drop test, comparative examples should have a similar adhesion level, that is to say the pummel value should not differ by more than one unit.

Example 1 shows that, with use of films according to the invention with iso-PVB in the outer layer, a much better penetration strength can be achieved than in Example 2, which is a comparative example containing only films based on polyvinyl (n)butyrals.

In addition, in examples 3 and 4 according to the invention, the overall film thicknesses are less than in Example 2, which would actually suggest a poorer penetration strength. However, it has surprisingly been found that a much better penetration strength can be obtained despite the lower film thickness.

The abbreviations used in the tables have the following meanings:

| | |
|---|---|
| PVA iso-PVB A: | PVA content of iso-PVB sub-layer A [% by weight] |
| PVA iso-PVB C | PVA content of iso-PVB sub-layer C [[% by weight] |
| PVA n-PVB B | PVA content of n-PVB sub-layer B [[% by weight] |
| PVA n-PVB A | PVA content of n-PVB sub-layer A [[% by weight] |
| PVA iso-PVB B | PVA content of iso-PVB sub-layer B [[% by weight |
| PVA n-PVB C | PVA content of n-PVB sub-layer C [[% by weight |
| Thickness iso-PVB | layer thickness of sub-layer iso-PVB [mm] |
| Thickness n-PVB | layer thickness of sub-layer n-PVB [mm] |
| Adhesion F/Sn CSS | compressive shear test [N/mm2] |
| Ball drop test | ball drop test according to ECE43 2mm glass, 30 × 30 cm, 2.26 Kg ball [drop height, m] |
| Mowiol 28-99 | commercial product from Kuraray Europe GmbH with a mean degree of polymerisation of 1700 |

TABLE 1

| Ex. | PVA iso-PVB A | PVA iso-PVB C | PVA n-PVB B | Thickness iso-PVB | Thickness n-PVB | Overall thickness | P content of sub-layer iso-PVB [% by weight] | P content of sub-layer n-PVB [% by weight] |
|---|---|---|---|---|---|---|---|---|
| 1 | 20.3 | 20.3 | 20.3 | 0.3 | 0.2 | 0.8 | 27.5 | 27.5 |
| 2 | — | — | 20.3 | — | 0.8 | 0.8 | 27.5 | 27.5 |
| 2a | 21.5 | 21.5 | 20.8 | 0.3 | 0.2 | 0.8 | 27.5 | 27.5 |

TABLE 2

| Ex. | PVA n-PVB A | PVA iso-PVB B | PVA n-PVB C | Thickness iso-PVB | Thickness n-PVB | Overall thickness | P content of sub-layer iso-PVB [% by weight] | P content of sub-layer n-PVB [% by weight] |
|---|---|---|---|---|---|---|---|---|
| 3 | 20.3 | 20.3 | 20.3 | 0.3 | 0.2 | 0.7 | 27.5 | 27.5 |
| 4 | 20.3 | 22.3 | 20.3 | 0.3 | 0.2 | 0.7 | 27.5 | 27.5 |

| Ex. | Adhesion F/Sn CSS | Pummel F | Pummel Sn | Ball drop test | Tear strength [N/mm$^2$] | Ultimate elongation [%] | P content of sub-layer iso-PVB after lamination [% by weight] | P content of sub-layer n-PVB after lamination [% by weight] |
|---|---|---|---|---|---|---|---|---|
| 1 | 14.6 | 4 | 4 | 11.0 | 29 | 254 | 28.3 | 25 |
| 2 | 14.5 | 5 | 3 | 5.0 | 30 | 270 | — | 27.5 |

-continued

| Ex. | Adhesion F/Sn CSS | Pummel F | Pummel Sn | Ball drop test | Tear strength [N/mm²] | Ultimate elongation [%] | P content of sub-layer iso-PVB after lamination [% by weight] | P content of sub-layer n-PVB after lamination [% by weight] |
|---|---|---|---|---|---|---|---|---|
| 2a | 16.4 | 4 | 2 | 6 | 28.9 | 259 | 28 | 26 |
| 3 | 13.6 | 5 | 3 | 7.0 | 28.8 | 272 | 28.6 | 26.5 |
| 4 | 15.9 | 6 | 4 | 7.75 | 29.9 | 270 | 27.6 | 27.4 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A film laminate, comprising at least three layers A, B and C, each layer containing at least one plasticizer and at least one polyvinyl acetal, wherein, at least one of the layers A, B or C contains at least one polyvinyl (iso)acetal having a mean degree of polymerisation of less than 3000, a proportion of polyvinyl alcohol groups of 10 to 25% by weight and a proportion of polyvinyl (iso)acetal groups of 50 to 80% by weight, wherein layer B has a plasticizer content of less than 32% by weight.

2. The film laminate of claim 1, wherein layer B is located between layer A and C.

3. The film laminate of claim 1, wherein layer B contains a polyvinyl acetal having the same or a larger proportion of polyvinyl alcohol groups than the polyvinyl acetal in layers A and C.

4. The film laminate of claim 1, having a sequence ABC, wherein
a layer A comprises at least one first plasticizer and one first polyvinyl (iso)acetal having a proportion of polyvinyl (iso)acetal groups of 50 to 80% by weight and a proportion of polyvinyl alcohol groups of 10 to 25% by weight,
a layer B comprises at least one second plasticizer and one polyvinyl (n)acetal having a proportion of polyvinyl alcohol groups of 10 to 25% by weight; and
a layer C comprises at least one third plasticizer and one second polyvinyl (iso)acetal having a proportion of polyvinyl (iso)acetal groups of 50 to 80% by weight and a proportion of polyvinyl alcohol groups of 10 to 25% by weight,
wherein said at least one first, second, and third plasticizers are the same or different, and wherein said first and second polyvinyl (iso)acetals are the same or different.

5. The film laminate of claim 1, having a sequence ABC, wherein
a layer A comprises at least one first plasticizer and one first polyvinyl (n)acetal having a proportion of polyvinyl alcohol groups of 10 to 25% by weight;
a layer B comprises at least one second plasticizer and polyvinyl (iso)acetal having a proportion of polyvinyl (iso)acetal groups of 50 to 80% by weight and a proportion of polyvinyl alcohol groups of 10 to 25% by weight; and
a layer C comprises at least one third plasticizer and one second polyvinyl (n)acetal having a proportion of polyvinyl alcohol groups of 10 to 25% by weight,
wherein said at least one first, second, and third plasticizers are the same or different, and wherein said first and second polyvinyl (n)acetals are the same or different.

6. The film laminate of claim 1, having a sequence ABC, wherein
a layer A comprises at least one first plasticizer and one first polyvinyl (iso)acetal having a proportion of polyvinyl (iso)acetal groups of 50 to 80% by weight and a proportion of polyvinyl alcohol groups of 10 to 25% by weight;
a layer B comprises at least one second plasticizer and second polyvinyl (iso)acetal having a proportion of polyvinyl (iso)acetal groups of 50 to 80% by weight and a proportion of polyvinyl alcohol groups of 10 to 25% by weight; and
a layer C comprises at least one third plasticizer and one third polyvinyl (iso)acetal having a proportion of polyvinyl (iso)acetal groups of 50 to 80% by weight and a proportion of polyvinyl alcohol groups of 10 to 25% by weight,
wherein said at least one first, second, and third plasticizers are the same or different, and wherein said first, second, and third polyvinyl (iso)acetals are the same or different.

7. The film laminate of claim 1, wherein adjacent layers have plasticizer contents which differ by at most 10 phr.

8. The film laminate of claim 1, wherein adjacent layers contain polyvinyl acetals of which the proportions of polyvinyl alcohol groups differ by at most 0.5% by weight.

9. The film laminate of claim 1, wherein the polyvinyl (iso)acetals are obtained by reacting at least one polyvinyl alcohol with one or more aliphatic keto compounds containing 4 to 10 carbon atoms having at least one branch alpha or beta to the keto group.

10. The film laminate of claim 1, wherein the polyvinyl (n)acetals are obtained by reacting at least one polyvinyl alcohol with one or more aliphatic, unbranched keto compounds containing 2 to 10 carbon atoms.

11. The film laminate of claim 1, wherein the film laminate is produced by co-extrusion of the layers.

12. The film laminate of claim 1, wherein the film laminate is produced by combining the layers.

13. A glass/film laminate/glass composite suitable for use in motor vehicles, aircraft, ships, architectural glazings, façade components, or for the production of photovoltaic modules, wherein the film laminate is a film laminate of claim 1.

* * * * *